(12) United States Patent
Jerdev

(10) Patent No.: US 7,969,488 B2
(45) Date of Patent: Jun. 28, 2011

(54) CORRECTION OF CLUSTER DEFECTS IN IMAGERS

(75) Inventor: Dmitri Jerdev, South Pasadena, CA (US)

(73) Assignee: Micron Technologies, Inc., Boise, ID (US)

( * ) Notice: Subject to any disclaimer, the term of this patent is extended or adjusted under 35 U.S.C. 154(b) by 1028 days.

(21) Appl. No.: 11/195,688

(22) Filed: Aug. 3, 2005

(65) Prior Publication Data

US 2007/0030365 A1  Feb. 8, 2007

(51) Int. Cl.
*H04N 9/64* (2006.01)

(52) U.S. Cl. ........ 348/246; 348/241; 348/243; 348/247; 348/251

(58) Field of Classification Search .................. 348/241, 348/243, 246, 247, 251, 187; 358/504
See application file for complete search history.

(56) References Cited

U.S. PATENT DOCUMENTS

| | | | |
|---|---|---|---|
| 6,526,366 B1 * | 2/2003 | Dunton | ........................ 702/116 |
| 6,650,789 B2 | 11/2003 | Edgar et al. | |
| 6,683,995 B2 | 1/2004 | Ford et al. | |
| 6,711,302 B1 | 3/2004 | Lee | |
| 6,806,902 B1 | 10/2004 | Donovan | |
| 7,432,985 B2 * | 10/2008 | Ishikawa et al. | ............... 348/616 |
| 2001/0052938 A1 | 12/2001 | Itoh | |
| 2003/0179418 A1 * | 9/2003 | Wengender et al. | .......... 358/437 |
| 2004/0096125 A1 * | 5/2004 | Alderson et al. | ............... 382/312 |
| 2004/0239782 A1 * | 12/2004 | Equitz et al. | ................... 348/246 |
| 2005/0024492 A1 * | 2/2005 | Schaefer et al. | ............... 348/135 |
| 2006/0257046 A1 * | 11/2006 | Rai et al. | ........................ 382/275 |

FOREIGN PATENT DOCUMENTS

JP  2001307079 A  * 11/2001

OTHER PUBLICATIONS

Johnathon Fewkes et al., Enhance picture quality using advanced camera system, Micron Technology, Inc.
Jonathon Fewkes et al., Enhance picture quality using advanced camera system, EE Times, China, Apr. 2005.

* cited by examiner

*Primary Examiner* — Yogesh K Aggarwal
(74) *Attorney, Agent, or Firm* — Dickstein Shapiro LLP

(57) ABSTRACT

A method and apparatus that allows for the correction of multiple defective pixels in an imager device. In one exemplary embodiment, the method includes the steps of selecting a correction kernel for a defective pixel, determining average and difference values for pixel pairs in the correction kernel, and substituting an average value from a pixel pair for the value of the defective pixel.

27 Claims, 7 Drawing Sheets

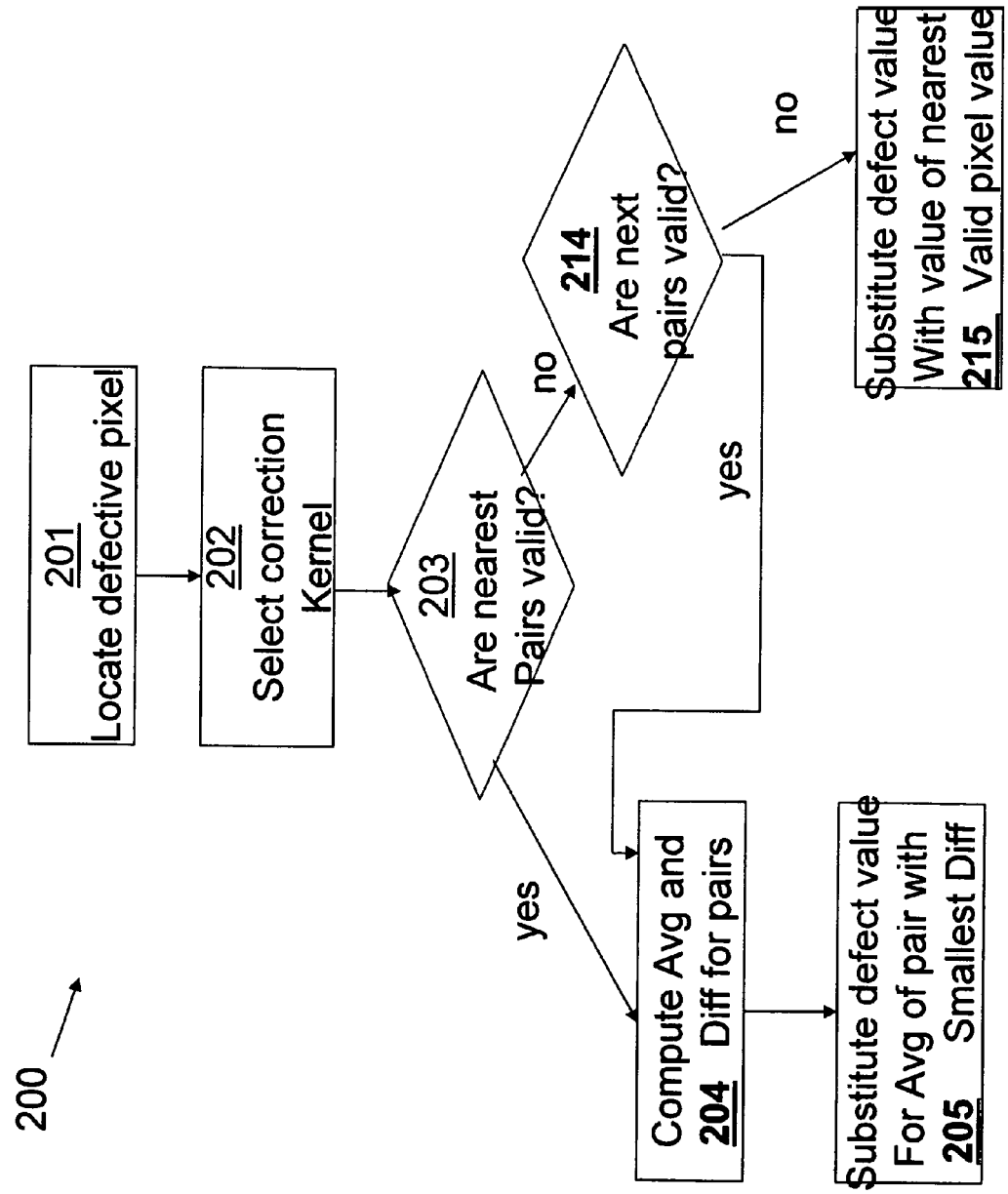

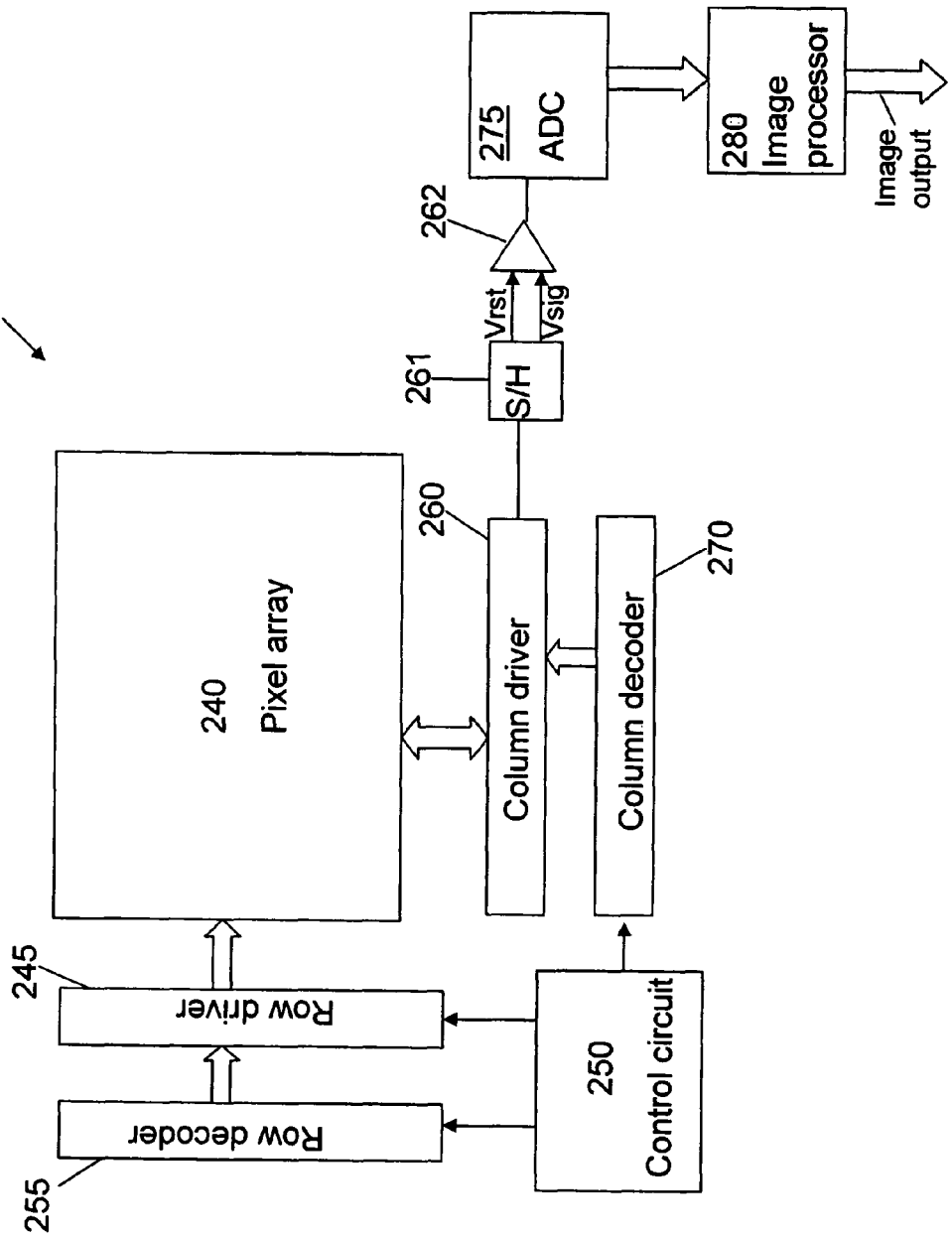

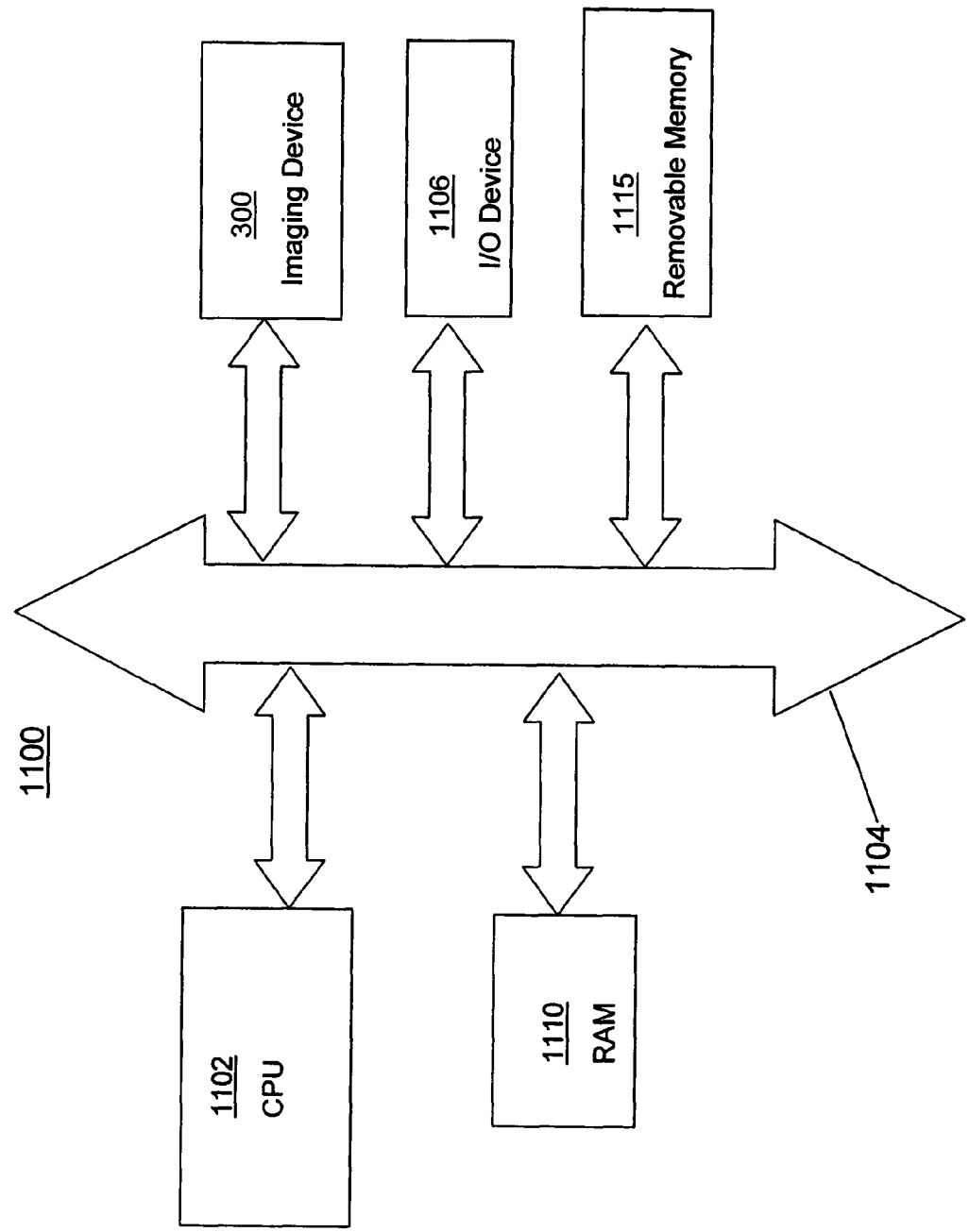

CORRECTION OF CLUSTER DEFECTS IN IMAGERS

FIELD OF THE INVENTION

The invention relates generally to the field of solid state imager devices, and more particularly to methods of correcting pixel defects in a solid state imager device.

BACKGROUND OF THE INVENTION

Solid state imagers, including charge coupled devices (CCD) and CMOS imagers, have been used in photo imaging applications. A solid state imager circuit includes a focal plane array of pixel cells, each one of the cells including a photosensor, which may be a photogate, photoconductor or a photodiode having a doped region for accumulating photo-generated charge.

During the manufacture of solid state imagers, the creation of defective pixels is unavoidable. These defective pixels, if not corrected, can cause severe degradation of image quality and, as a result, decrease the yield of parts during production. Thus, minimization of these defects during fabrication will yield a higher quality product. However, it is usually less expensive to make a device (e.g., semiconductor imager device) using less precise manufacturing tolerances. Devices that are produced using less precise manufacturing tolerances, on the other hand, have a higher probability of defects. Typical semiconductor fabrication rules define some tradeoff between the quality (lack of defects) and cost of manufacture. The manufactured semiconductor devices are tested for defects, and any semiconductor device having more than a certain percentage of defects is usually discarded.

Image acquisition semiconductor devices are especially sensitive to defects. A bad pixel in an imaging semiconductor will show up as a bad area on the acquired. The defective pixels may not work at all or, alternatively, may be significantly brighter or dimmer than expected for a given light intensity. Depending on the desired quality and the intended application, a single defective pixel may sometimes be sufficient to cause the device containing the pixel to be discarded.

In most instances, however, a small percentage of defective pixels can be tolerated and compensated for. Numerous techniques exist for locating and correcting defective pixel in a semiconductor imager device.

One simple technique for single defective pixel correction involves taking a signal from each pixel and storing the pixel values in memory. During image processing, the saved value for a defective pixel can be replaced by the average signal value of the neighboring pixels. These simple methods, however, are not viable for all pixel defects, for example, those suffering from excessive dark current. Other more complicated methods have been devised that can also correct defective pixels, including dark current pixels. For example, see the method discussed in the paper submitted by B. Dierickx and G. Meyanants "Missing Correction Method for Image Sensors," submitted for Europto-SPIE/AFPAEC May 18-21, 1998.

Correction of multiple defects in a small area of an array, termed cluster defects, however, still remain a significant challenge. Accordingly, there is a need and desire for a method of correcting defective pixel clusters to improve the yield of imager manufacturing.

BRIEF SUMMARY OF THE INVENTION

The invention, in various exemplary embodiments, relates to a method and apparatus that allows for the correction of defective pixel clusters in an imaging device.

In accordance with embodiments of the invention, the method and implementing apparatus selects a correction kernel, which includes neighboring pixel pairs, for an area identified as including defective pixels, determines average and difference output signal values for pixel pairs in the correction kernel, and substitutes a readout signal for the defective pixel output signal during image processing. The substituted read out signal is selected from a valid, neighboring pixel pair, which is a pair without a defective pixel and having the lowest difference in signal value.

BRIEF DESCRIPTION OF THE DRAWINGS

The foregoing and other advantages and features of the invention will be more readily understood from the following detailed description of the invention provided below with reference to the accompanying drawings, in which:

FIG. 4 shows a flow chart of an method for correcting a pixel defect in accordance with an exemplary method of the invention;

FIG. 5 shows a block diagram of an imager constructed in accordance with an exemplary embodiment of the invention; and FIG. 6 shows a processor system incorporating at least one imaging device constructed in accordance with an embodiment of the invention.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and electrical changes may be made without departing from the spirit and scope of the present invention. The progression of processing steps described is exemplary of embodiments of the invention; however, the sequence of steps is not limited to that set forth herein and may be changed as is known in the art, with the exception of steps necessarily occurring in a certain order.

The term "pixel," as used herein, refers to a photo-element unit cell containing a photosensor device and associated structures for converting photons to an electrical signal. For purposes of illustration, a single representative three-color pixel array is illustrated in the figures and description herein. However, the invention may be applied to monochromatic imagers as well as to imagers for sensing fewer than three or more than three color components in an array. Accordingly, the following detailed description is not to be taken in a limiting sense, and the scope of the present invention is defined only by the appended claims.

Figure 1:
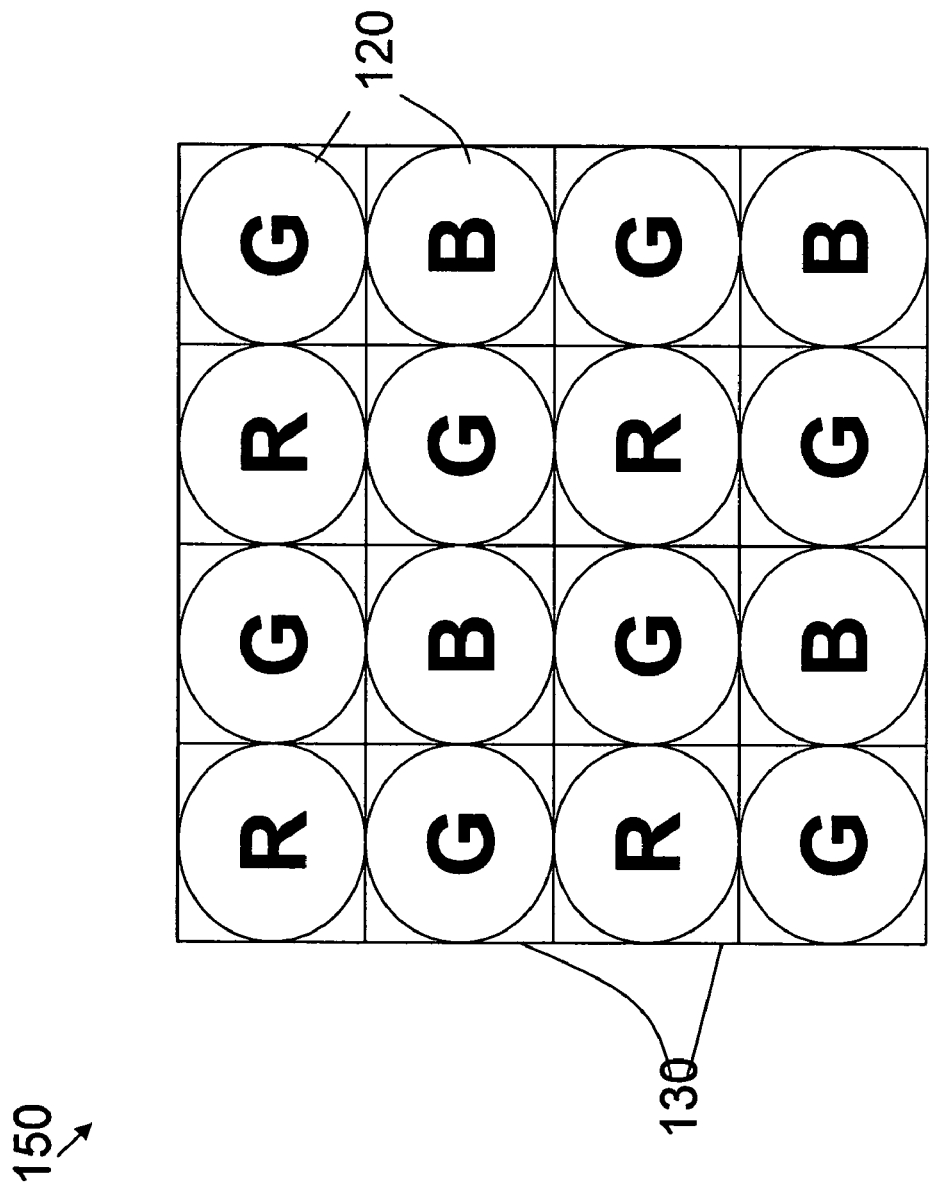
FIG. 1 is a top-down view of a conventional microlens and color filter array used in connection with a pixel array.

In addition, it should be understood that, taken alone, a pixel generally does not distinguish one incoming color of light from another and its output signal represents only the intensity of light received, not any identification of color. However, pixels 130, as discussed herein, are referred to by color (i.e., "red pixel," "blue pixel," etc.) when a color filter 120 (FIG. 1) is used in connection with the pixel to focus a particular wavelength range of light, corresponding to a particular color, onto the pixel. FIG. 1 depicts a conventional color filter array, arranged in a Bayer pattern, covering a pixel array to focus the incoming light thereat. Accordingly, when the term "red pixel" is used herein, it is referring to a pixel with a red color filter. Filters of other colors similarly filter wavelength ranges corresponding to the color to which they refer.

Median defect correction is a method of assigning a single defective pixel the value of a neighboring pixel. This method does not work on defect clusters, although it remains a viable option for fixing single pixel defects. A simple example of median correction starts with an imaging circuit for image processing, such as image processor 280 (FIG. 5), which is provided with or determines a location of a defective pixel. The defect may be identified by the imaging circuit comparing each pixel signal to those of neighboring pixels and recognizing that one pixel has a value that is significantly out-of-range in comparison. For example, for a group of pixels in an area, if the minimum or maximum signal is much lower or higher, respectively, than the other pixels, the image processor recognizes this mistake and assigns that defective pixel the average value of the neighboring pixels of the same color. This method does not work on pixel clusters, which can be defined as two or more defective pixels of the same color within a three-by-three grid of pixels in an array. Median defect correction does not work on cluster defects because with a defect cluster, one of the neighboring pixels also has a defective value, and therefore, the median value can not be used for substitution.

An alternative method for correcting defective pixels occurs during manufacture, when defective pixels may be identified by fuses or provided in a stage area attached to an image processor. This method may be effective to correct cluster defects as well as individual defect pixels. To correct defective pixels, the location of which are part of a cluster, the defects are determined during image sensor manufacturing and production testing. Such pixels may be labeled with fuses in order to be identified during normal operation, by for example, giving the defective pixel a value of "0." The imaging circuit ensures that the value reaches the defect correction circuitry unchanged. When a pixel with a value of "0" comes into the defect correction block, it is corrected based upon the value of its neighbors.

It should be noted that numerous alternative methods for locating defective pixels, including pixels located within a cluster, may be used. For example, image processing software may be used to locate the defective pixels. Other techniques which find and store locations of a bad pixel or cluster may also be used in accordance with the invention.

In accordance with the exemplary embodiments of present invention, a defect correction method is performed, preferably by a correction circuit in a color processing pipeline, to correct cluster defects. It should be noted that other defect corrections, including median defect correction, may be performed simultaneously to correct single pixels as described above. Cluster defect correction has the highest priority and in the normal operation mode it will supersede median defect correction. Cluster defect correction works on those pixels 32 (FIGS. 2A, 2B) that are labeled as part of a defective cluster, either with fuses, or by any other suitable identification technique.

Figure 2A:
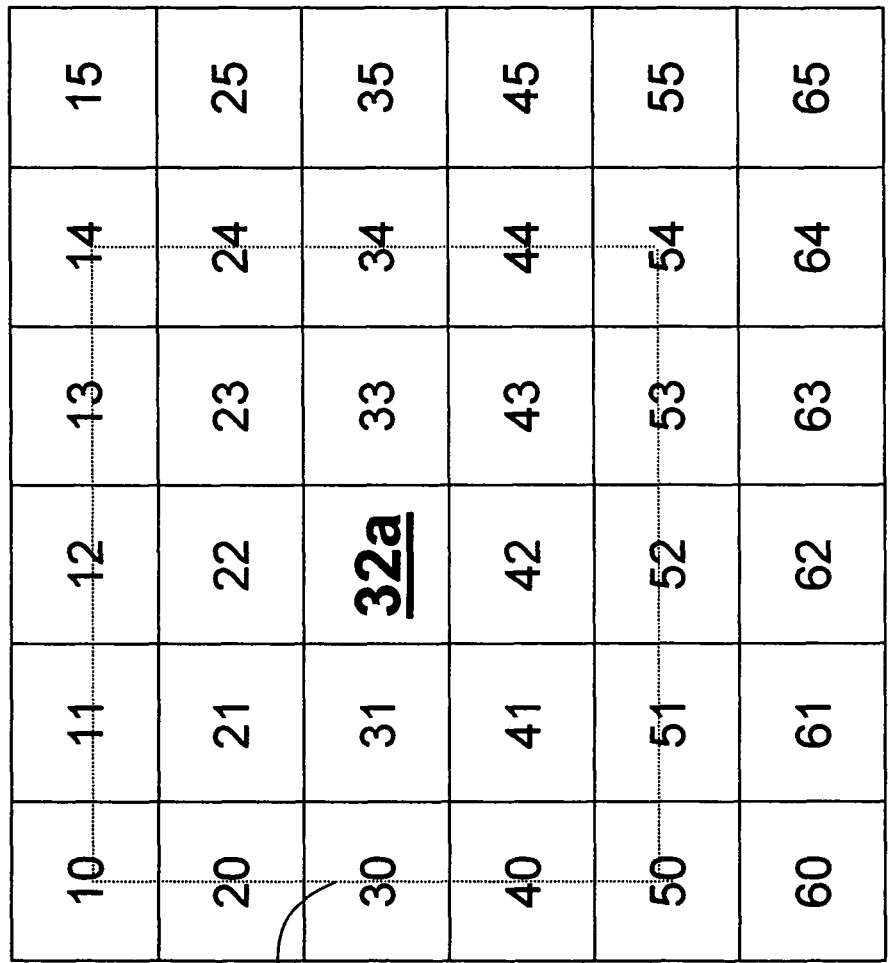
FIG. 2A depicts a correction kernel for a defective red or blue pixel of a pixel array in accordance with the invention.
Figure 2B:
FIG. 2B depicts a correction kernel for a defective green pixel of a pixel array in accordance with the invention.

Turning now to the Figures, FIGS. 2A, 2B illustrate parts of pixel arrays 100, 110, respectively, each having a respective defective pixel 32a, 32b that will undergo a cluster defect corrective method in accordance with the invention. Pixel array 100 has a located defective pixel 32a of a cluster, which can be either a red or a blue pixel. Pixel array 110 has a defective pixel 32b that represents a green pixel. It should be noted that in order for pixels 32a, 32b to be considered part of a defect cluster, at least one neighboring pixel of the same color, as shown in the Figures, must also be identified as defective.

In the illustrated examples, it is assumed that the pixel arrays 100, 110 are associated with a Bayer pattern color filter array 150 (FIG. 1); however, the invention may also be used with other color filter patterns. The color filters 120 focus incoming light of a particular wavelength range onto the underlying pixels 130. In the Bayer pattern, every other pixel array row consists of alternating red (R) and green (G) colored pixels, while the other rows consist of alternating green (G) and blue (B) color pixels.

To correct cluster-labeled defects, the present invention utilizes values of first and second nearest neighbor pairs of the identified, defective pixel 32a, 32b. These neighbors are collectively referred to herein as a defect correction kernel, shown in FIGS. 2A and 2B respectively as 101a, 101b. A total of eight neighbor pixels are included in each correction kernel 101a, 101b. It should be noted, that the illustrated correction kernels 101a, 101b are exemplary, and that other correction kernels may be chosen for pixel arrays using color filter patterns other than the Bayer pattern. In addition, a correction kernel could encompass more or less than eight neighboring pixels if desired.

In FIGS. 2A and 2B, the exemplary correction kernels 101a, 101b are outlined with a dotted line. For kernel 101a there are eight pixels (10, 12, 14, 34, 54, 52, 50, and 30) having the same color as the defective pixel 32a. Although it appears that correction kernel 101a contains sixteen pixels, it should be noted that half of these would be green pixels, whose signals would not be considered for use in correction of a red or blue pixel 32a. The actual pixels that make up kernel 101a are shown in greater detail in FIG. 3. For kernel 101b there are also eight pixels (12, 23, 34, 43, 52, 41, 30, and 21) having the same green color as the defective pixel 32b.

With reference to FIG. 4, an exemplary method 200 of the present invention is now be described. The method can be carried out by the image processing circuit (described below with reference to FIG. 5). It should be understood that each pixel has a value that represents an amount of light received at the pixel. Although representative of a readout signal Vsig from the pixel, the value is a digitized representation of the signal. Thus, the values range from 1 for dark pixels to 1023 for saturated pixels. These values are represented in the following description as $P_x$ where "P" is the value and "x" is the pixel number shown in FIGS. 2A and 2B.

At an initial step 201, the defective pixels 32a, 32b are located by processing circuitry using any known defect location technique. The value of these pixels is pre-set to "0" as one means of clearly identifying the defective pixels. Next, at step 202 the selection kernel 101a for a cluster-labeled, defective pixel 32 (FIG. 3) is selected. After the associated kernel 101a is selected for pixel 32, each of the pixels symmetrically located around the defective pixel 32a are evaluated during step 203. If an opposing pair of the pixels has two good (i.e., non-defective) pixels, the pair is regarded as a valid pair and the method 200 proceeds to step 204. Otherwise, when at least one pixel in the pair is defective, then the pair is declared invalid and discarded from further consideration; further in this case, the method 200 continues at step 214.

Figure 3:
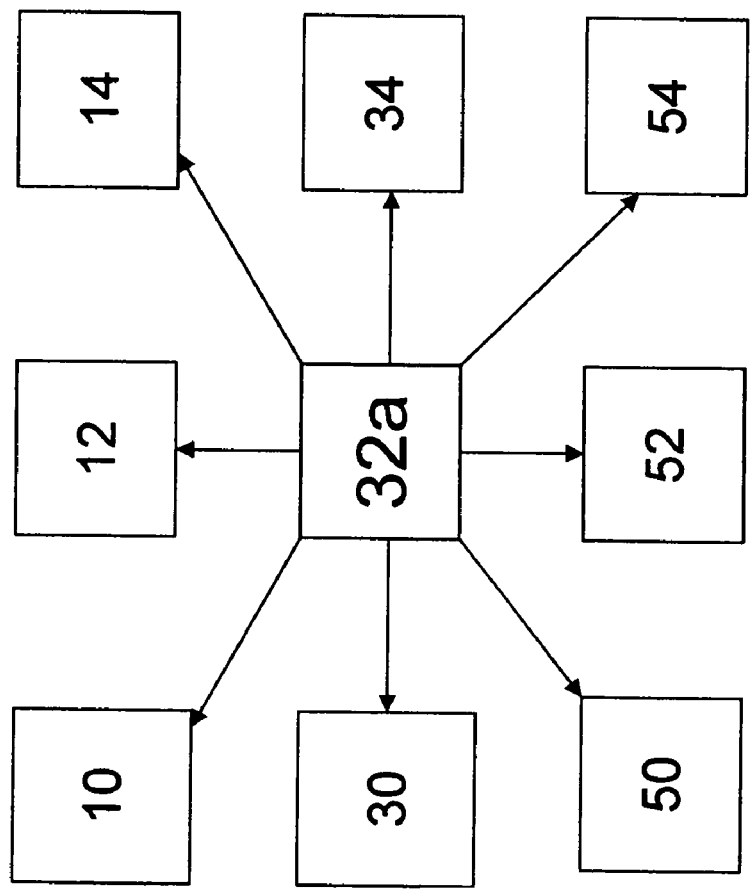
FIG. 3 depicts the correction kernel of FIG. 1 in more detail.

For example, in FIG. 3 the first pixel pair considered with respect to defective pixel 32a may be pixel pair 12, 52. If one of the two pixels is defective, the pixel pair 12, 52 is no longer considered. The other pixel pairs for defective pixel 32a are 30, 34; 10, 54; and 14, 50.

At step 204, for each valid pair of pixels, where both pixels are not defective, two values are calculated: the difference D between the values (as an absolute value) and the average value A of the pixels signals. For pixel pair 12, 52, therefore, the values $D=|P_{12}-P_{52}|$ and $A=(P_{12}+P_{52})/2$ are calculated. If the two closest pixel pairs 12, 52 and 30, 34 are both valid, the average value A of one of the pixel pairs is then substituted, at step 205, as the value for the defective pixel $P_{32a}$. Of the average values A for the two pixel pairs 12, 52 and 30, 34, the average value A from the pixel pair with the lowest difference D is substituted as the value $P_{32a}$ for pixel 32a.

If, on the other hand, one of the nearest pixel pairs is invalid at step 203, the next nearest pixel pairs 10, 54 and 14, 50 are then evaluated for valid pairs. If valid pixel pairs are found in step 214, the method then continues at step 204 and the calculations discussed above with regard to this step are repeated for the valid pixel pairs before moving to step 205 to complete value substitution. Thus, in step 204, an average A and a difference D is calculated for each valid pixel pair. Assuming there are multiple valid pixel pairs, either from step 203 or step 214, then at step 205, the average value A for the pixel pair having the lowest difference D is substituted for the value $P_{32a}$ for pixel 32a.

If, however, no valid pixel pairs were found at step 214, the method 200 proceeds to step 215. At step 215, the pixel value $P_x$ for the nearest, same color, non-defective pixel "X" is substituted for the value $P_{32a}$ of the defect pixel 32a.

FIG. 5 illustrates an exemplary imaging device 300 having a pixel array 240. Row lines of the array 240 are selectively activated by a row driver 245 in response to row address decoder 255. A column driver 260 and column address decoder 270 are also included in the imaging device 300. The imaging device 300 is operated by the timing and control circuit 250, which controls the address decoders 255, 270. The control circuit 250 also controls the row and column driver circuitry 245, 260.

A sample and hold circuit 261 associated with the column driver 260 reads a pixel reset signal Vrst and a pixel image signal Vsig for selected pixels of the array 240. A differential signal (Vrst–Vsig) is produced by differential amplifier 262 for each pixel and is digitized by analog-to-digital converter 275 (ADC). The analog-to-digital converter 275 supplies the digitized pixel signals to an image processor 280 which forms and may output a digital image. The image processor 280 has a circuit that is capable of performing the method 200 for cluster defect correction on pixel array 240.

FIG. 6 shows system 1100, a typical processor system modified to include the imaging device 300 (FIG. 5) of the invention. The system 1100 is exemplary of a system having digital circuits that could include image sensor devices. Without being limiting, such a system could include a computer system, still or video camera system, scanner, machine vision, video phone, and auto focus system, or other imager applications.

System 1100, for example a camera system, generally comprises a central processing unit (CPU) 1102, such as a microprocessor, that communicates with an input/output (I/O) device 1106 over a bus 1104. Imaging device 300 also communicates with the CPU 1102 over the bus 1104. The processor-based system 1100 also includes random access memory (RAM) 1110, and can include removable memory 1115, such as flash memory, which also communicate with the CPU 1102 over the bus 1104. The imaging device 300 may be combined with a processor, such as a CPU, digital signal processor, or microprocessor, with or without memory storage on a single integrated circuit or on a different chip than the processor.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, the methods can be used with pixels in other patterns than the described Bayer pattern, and the correction kernels would be adjusted accordingly. In addition, the invention is not limited to the type of imager device in which it is used. Thus, the invention is not to be seen as limited by the foregoing description, but is only limited by the scope of the appended claims.

What is claimed as new and desired to be protected by Letters Patent of the United States is:

1. A method for correcting pixel defects comprising:
    selecting a set of pixels surrounding an identified defective pixel, wherein said set comprises a first and a second plurality of pairs of pixels, each pair including different first and second pixels;
    for said first plurality of pairs of pixels within said set, determining if said first and second pixels of each pair of pixels are both not defective;
    if at least one of said individual pixels in said first plurality of pairs of pixels is defective, determining if said first and second pixels of each pair of pixels of said second plurality of pairs of pixels are both not defective;
    if at least one of said first and second pluralities of pairs of pixels does not have a defective pixel, for each pair of pixels of one of said first and second plurality of pairs not having a defective pixel, determining an average value of the pixels of the pair; and
    substituting one of the determined average values as a value for the defective pixel.

2. The method of claim 1, further comprising determining a difference value for each of said pairs of pixels in said one of said first and second plurality not having a defective pixel and substituting an average value of the pixel pair that has the smallest difference value.

3. The method of claim 1, wherein the act of selecting the set of pixels surrounding an identified defective pixel comprises selecting a predetermined number of nearest pixels having the same color as the defective pixel.

4. The method of claim 3, wherein the predetermined number is eight.

5. The method of claim 1, wherein if none of said individual pixels in said first plurality of pairs of pixels are defective, the method further comprises:
    comparing a difference among values of said first and second pixels for each pair of said first plurality; and
    substituting an average value of the pixel pair having the smallest difference for the value of the defective pixel.

6. The method of claim 1, wherein if at least one of said individual pixels in said first plurality of pairs of pixels is defective and none of said individual pixels in said second plurality of pairs of pixels are defective, the method further comprises:
    comparing a difference among values of said first and second pixels for each pair of said second plurality; and
    substituting an average value of the pixel pair having the smallest difference for the value of the defective pixel.

7. The method of claim 1, further comprising:
if at least one of said individual pixels in said first plurality is defective and at least one of said individual pixels in said second plurality is defective, substituting a value from an individual pixel in the set of pixels as a value for the defective pixel.

8. A method for correcting pixel defects comprising:
selecting a set of pixels surrounding an identified defective pixel, wherein said set comprises a plurality of pairs of pixels, each pair including different first and second pixels;
for a plurality of pairs of pixels within said set, determining if said first and second pixels of the pair of pixels are both not defective;
for each pair of pixels of said plurality of pairs of pixels which does not have a defective pixel, determining an average value of the pixels of the pair;
substituting a determined average value as a value for the defective pixel; and
substituting a value from an individual pixel in the set of pixels if each of a first, second, third, and fourth pixel pair has at least one defective pixel.

9. An imaging device comprising:
a pixel array comprising a plurality of pixels, each pixel outputting a signal representing an amount of light received thereat; and
a correction circuit for locating and correcting at least one defective pixel, wherein the correction circuit is configured to
select a set of pixel pairs surrounding the defective pixel, each pixel pair including different first and second pixels,
determine whether a first plurality of pixel pairs of the set includes any defective pixels,
if said first plurality of pixel pairs includes any defective pixels, determine whether a second plurality of pixel pairs of the set includes any defective pixels, and
if at least one of said first and second pluralities does not include any defective pixels, substitute an average value of one of the pixel pairs of one of said pluralities not having any defective pixels for a value of the defective pixel.

10. The imaging device of claim 9, wherein the at least one defective pixel to be corrected is part of a cluster of defective pixels.

11. The imaging device of claim 9, wherein the correction circuit further performs median defect correction for correcting individual defective pixels.

12. The imaging device of claim 11, wherein for an individual defective pixel the correction circuit assigns a predetermined value of zero so that it is identified as a defective pixel.

13. The imaging device of claim 10, wherein the cluster of defective pixels is identified by a fuse resulting in pixels of the cluster outputting a predetermined value.

14. The imaging device of claim 9, wherein the set comprises four pixel pairs, each pair comprising first and second individual pixels.

15. The imaging device of claim 14, wherein the correction circuit compares a difference among values for individual pixels of first and second pixel pairs of the one of said pluralities not having any defective pixels.

16. The imaging device of claim 9, wherein the first plurality of pixel pairs includes first and second pixel pairs comprising pixels located nearest to the defective pixel.

17. The imaging device of claim 15, wherein the correction circuit assigns the defective pixel an average value of a pixel pair having the lowest difference among the first and second pixel pairs.

18. The imaging device of claim 9, wherein the correction circuit is configured to select a predetermined number of pixel pairs for the set.

19. The imaging device of claim 9, wherein said correction circuit is further configured to substitute a value from an individual pixel in the set of pixels for a value of the defective pixel if both of said first and second pluralities include a defective pixel.

20. An imaging device comprising:
a pixel array comprising a plurality of pixels, each pixel outputting a signal representing an amount of light received thereat; and
a correction circuit for locating and correcting at least one defective pixel, wherein the correction circuit is configured to select a set of pixel pairs surrounding the defective pixel, each pixel pair including different first and second pixels, determine whether a plurality of pixel pairs of the set include any defective pixels, and substitute an average value of one of the pixel pairs of the set which has no defective pixels for a value of the defective pixel,
wherein the set comprises four pixel pairs, each pair comprising first and second individual pixels,
wherein the correction circuit compares a difference among values for individual pixels of first and second pixel pairs in the set, if each of the pixels in the first and second pixel pairs is non-defective, and
wherein the correction circuit compares a difference among values for individual pixels of third and fourth pixel pairs of the set if either of the first or the second pixel pairs includes a defective pixel.

21. A processing system comprising:
a processor; and
an imaging device connected to the processor and comprising:
a pixel array comprising a plurality of pixels, each pixel outputting a signal representing an amount of light received thereat; and
a correction circuit for locating and correcting at least one defective pixel, wherein the correction circuit is configured to
select a set of pixel pairs surrounding the defective pixel, each pixel pair including different first and second pixels,
determine whether a first plurality of pixel pairs of the set includes any defective pixels,
if said first plurality of pixel pairs includes any defective pixels, determine whether a second plurality of pixel pairs of the set includes any defective pixels,
if at least one of said first and second pluralities does not include any defective pixels, for each pair of pixels of one of said first and second plurality of pairs not having a defective pixel, determine an average value of the pixels of the pair, and
substitute one of the determined average values for a value of the defective pixel.

22. The processing system of claim 21, wherein the imaging device is a CMOS imager.

23. The processing system of claim 21, wherein the imaging device is a CCD imager.

24. The processing system of claim 21, wherein the value of a given pixel is a digitized representation of the amount of light received by that pixel.

25. The processing system of claim 21, wherein the first plurality of pixel pairs includes a closest two pairs of pixels to the defective pixel of the same color as the defective pixel.

26. The processing system of claim 21, wherein the correction circuit is configured to select a predetermined number of pixel pairs for the set.

27. A processing system comprising:
a processor; and
an imaging device connected to the processor and comprising:
   a pixel array comprising a plurality of pixels, each pixel outputting a signal representing an amount of light received thereat; and
   a correction circuit for locating and correcting at least one defective pixel, wherein the correction circuit is configured to select a set of pixel pairs surrounding the defective pixel, each pixel pair including different first and second pixels, determine whether a plurality of pixel pairs of the set include any defective pixels, and substitute an average value of one of the pixel pairs of the set which has no defective pixels for a value of the defective pixel,
wherein the correction circuit compares a difference among values for individual pixels of first and second pixel pairs in the set if each of the pixels of the first and second pixel pairs is non-defective, and wherein the first and second pixel pairs are a closest two pairs of pixels to the defective pixel of the same color as the defective pixel, and
wherein the correction circuit is further configured to determine average values of third and fourth pixel pairs if at least one pixel from the first and second pairs is determined to be defective.

* * * * *

UNITED STATES PATENT AND TRADEMARK OFFICE
CERTIFICATE OF CORRECTION

| | | |
|---|---|---|
| PATENT NO. | : 7,969,488 B2 | Page 1 of 1 |
| APPLICATION NO. | : 11/195688 | |
| DATED | : June 28, 2011 | |
| INVENTOR(S) | : Dmitri Jerdev | |

It is certified that error appears in the above-identified patent and that said Letters Patent is hereby corrected as shown below:

On the cover page, item (73), in "Assignee", in column 1, line 1, delete "Technologies," and insert -- Technology, --, therefor.

In column 7, line 30, in Claim 9, after "to" insert -- : --.

In column 8, line 45, in Claim 21, after "to" insert -- : --.

Signed and Sealed this
Sixteenth Day of August, 2011

David J. Kappos
*Director of the United States Patent and Trademark Office*